United States Patent [19]
Kitajewski et al.

[11] 4,022,980
[45] May 10, 1977

[54] RING TRIP DETECTOR

[75] Inventors: Ryszard Kitajewski, Broxbourne; Anthony William Sweet, Bishops Stortford; Michael Philip Dyer, Old Harlow, all of England

[73] Assignee: International Standard Electric Corporation, New York, N.Y.

[22] Filed: Mar. 3, 1976

[21] Appl. No.: 663,396

[30] Foreign Application Priority Data

Mar. 25, 1975 United Kingdom ............. 12370/75

[52] U.S. Cl. .......................... 179/18 HB; 179/84 A
[51] Int. Cl.² ........................................ H04M 3/02
[58] Field of Search ............ 179/84 R, 84 A, 84 C, 179/18 HB, 81 R, 81 A, 99, 18 F, 18 FA

[56] References Cited
UNITED STATES PATENTS

| | | | |
|---|---|---|---|
| 3,899,644 | 8/1975 | Hunt | 179/84 R |
| 3,903,375 | 9/1975 | De Wit | 179/18 HB |

*Primary Examiner*—Thomas A. Robinson
*Attorney, Agent, or Firm*—John T. O'Halloran; Alfred C. Hill

[57] ABSTRACT

A Hall effect device is employed in telephone exchange circuitry for detecting when a called subscriber goes off-hook. This is done by detecting when a DC current due to line looping is superimposed on the AC current due to ringing whereupon ring trip occurs. Also described are circuits in which after ring trip has taken place the Hall device continues to supervise the called line loop.

6 Claims, 4 Drawing Figures

RING TRIP DETECTOR

BACKGROUND OF THE INVENTION

The present invention relates to electrical circuits for ring trip detection in telephone exchanges.

SUMMARY OF THE INVENTION

In accordance with the present invention there is provided an electrical ring trip detection circuit comprising: a Hall effect device to couple ringing current to a called subscriber's subset line and to generate at its output an output voltage that is proportional to the current flow to the line; first means coupled to the device responsive to the output voltage to indicate whether or not direct current is on the line superimposed on the ringing current; and second means coupled to the first means and the device to disconnect the ringing current and to complete the connection to the line for communication being a calling party and a called party when the direct current is detected.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

In a Hall effect device as used herein, an electrical condition to be monitored influences the current in the device's energizing winding or windings, and produces a magnetic field normal to the plane of the Hall element. This element is located in an air gap in the magnetic circuit, which may be an E shaped magnetic material core with an I-shaped magnetic material core fitted together to produce a three-legged core. There is a small air gap in the central leg in which the Hall effect element is located, e.g. by glueing. A control current flows across the element and an output voltage is generated across the other dimension of the Hall element. Thus the output voltage, the control current and the magnetic field are mutually at right-angles to each other. The Hall element is a single crystal structure or a deposited thin film of a semi-conductor material, preferably with a temperature-independent characteristic. The magnetic circuit may be a soft iron, a modern ferrite, or any other suitable magnetic material. In all of the accompanying drawings the Hall effect element HS is shown separated from its windings HED, with an arrow interconnecting them to show that the element is part of the Hall effect device.

Figure 1:
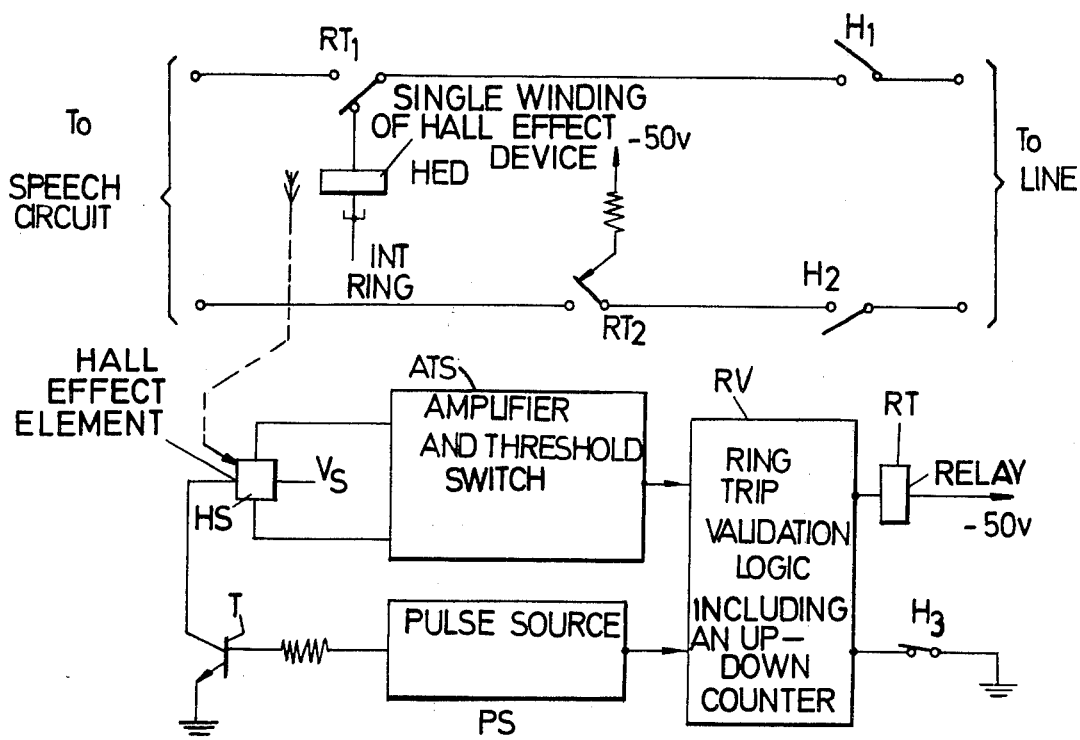
FIG. 1 is a simplified block diagram of the ring trip detector in accordance with the principles of the present invention.

Referring first to FIG. 1, when a connection has been extended to an outgoing line, a relay H (not shown) is operated, and contacts H1 and H2 complete the outgoing circuit for the alternating current (AC) ringing current. Ring current is applied to the called subscriber subset via the single winding HED of the Hall effect device, contacts RT1 and H1, the line, and contacts H2 and RT2. The control direct current is applied from the source $V_S$ to the Hall effect element via the collector-emitter circuit of a transistor T. This transistor is switched on by a control input to its base from the pulse source PS when a call has been extended as just mentioned. This control current is a pulsed one to reduce power consumption.

Hence the output from the Hall element HS to the amplifier and threshold switch ATS will be, during the pulse from pulse source PS, an AC voltage until the called subscriber replies. When he does so, direct current (DC) flows in the loop, and the output from Hall effect element HS to amplifier and threshold switch ATS becomes AC super-imposed on DC. The output from amplifier and threshold switch ATS becomes logic 1 when this DC is present, and this is applied to ring trip and validation logic RV. This assesses whether the change of input is a true loop condition and not a transient condition, e.g., by accepting it as a valid loop if it persists for a pre-selected number of pulses from pulse source PS. When the circuit RV decides that the loop condition is valid, it operates the relay RT, which disconnects the ringing and completes the loop to the called line. When in due course the call ends, relay H releases to open the loop at contacts H1 and H2 and it resets circuit RV at contact H3.

The delay introduced by circuit RV in assessing the validity of a loop condition can be provided by analog means, e.g., by an integration technique, or digitally. In the latter case an up-down counter can be used to count pulses from source PS at which the line is looped. If a pulse from source PS finds the line unlooped it counts down once. Only when the counter has reached a preset condition is it assumed that the line is looped, and ringing is tripped.

Figure 2:
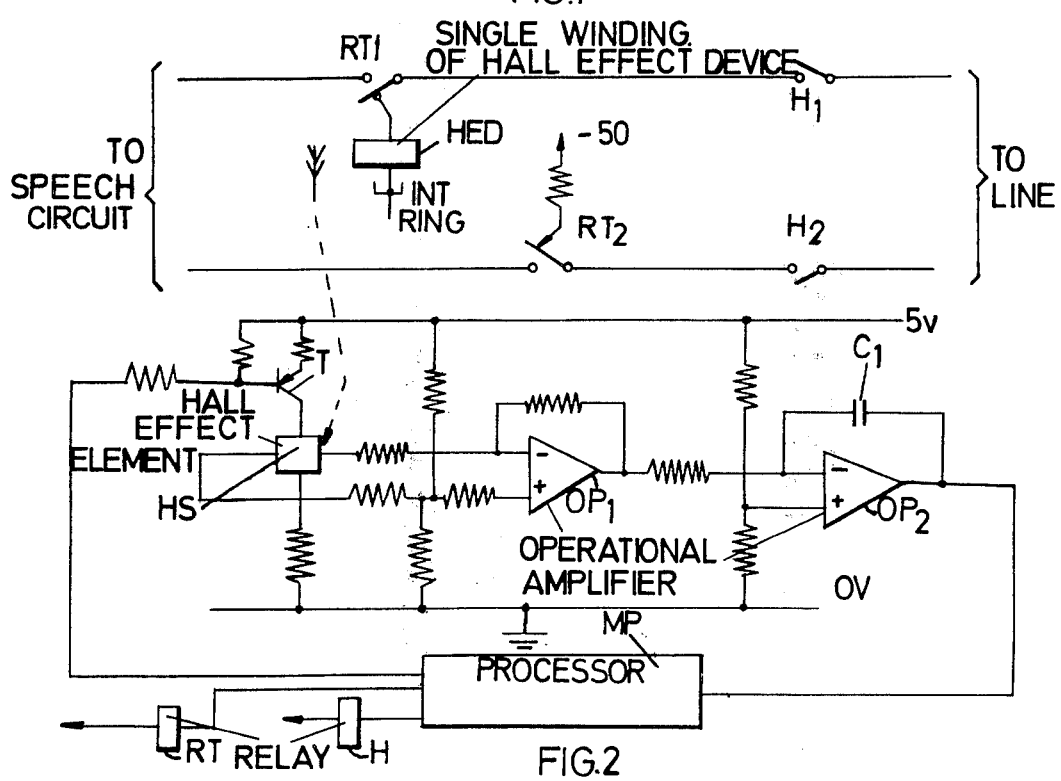
FIG. 2 is a somewhat more detailed block diagram of a second ring trip detector in accordance with the principles of the present invention.

FIG. 2 is in some respects similar to FIG. 1, and uses standard operational amplifiers to perform an analog integrator method of discrimination in conjunction with a micro-processor MP, which is preferably a device such as described and claimed in the copending U.S. Pat. application of A. W. Sweet, Ser. No. 580,274, filed May 23, 1975, whose disclosure is incorporated herein by reference. The thresholds to which operational amplifiers OP1 and OP2 respond are fixed by the potential dividers connected to their non-inverting inputs. When the line is to be rung, the processor MP operates relay H, which at contacts H1 and H2 completes the loop for supplying interrupted ringing to the line. As in FIG. 1, this ringing flows in the single winding HED of the Hall effect device. In addition, processor MP switches on the sampling current through Hall effect element HS at the base of the transistor T. Of the two operational amplifiers, amplifier OP1 acts as an amplifier while amplifier OP2 acts as an integrator since it has a capacitor C1 connected across it as shown. When the called line replies and completes the loop for direct current, the output of amplifier OP2 moves from 0 volts to +5 volts, i.e. from a logic 0 state to a logic 1 state. This change in condition is detected by the processor MP, which thereupon operates relay RT to trip the ringing and completes the talking loop. As before, relay H is released when the call ends.

In the two circuits to be described with reference to FIGS. 3 and 4, the functions of loop detection and ring trip are combined, using the analog circuitry as used in FIG. 2, with a micro-processor MP, which is preferably of the type described and claimed in the above-cited copending application. The changeover of function between loop detection and ring-trip detection is effected by the programming of the processor MP.

Figure 3:
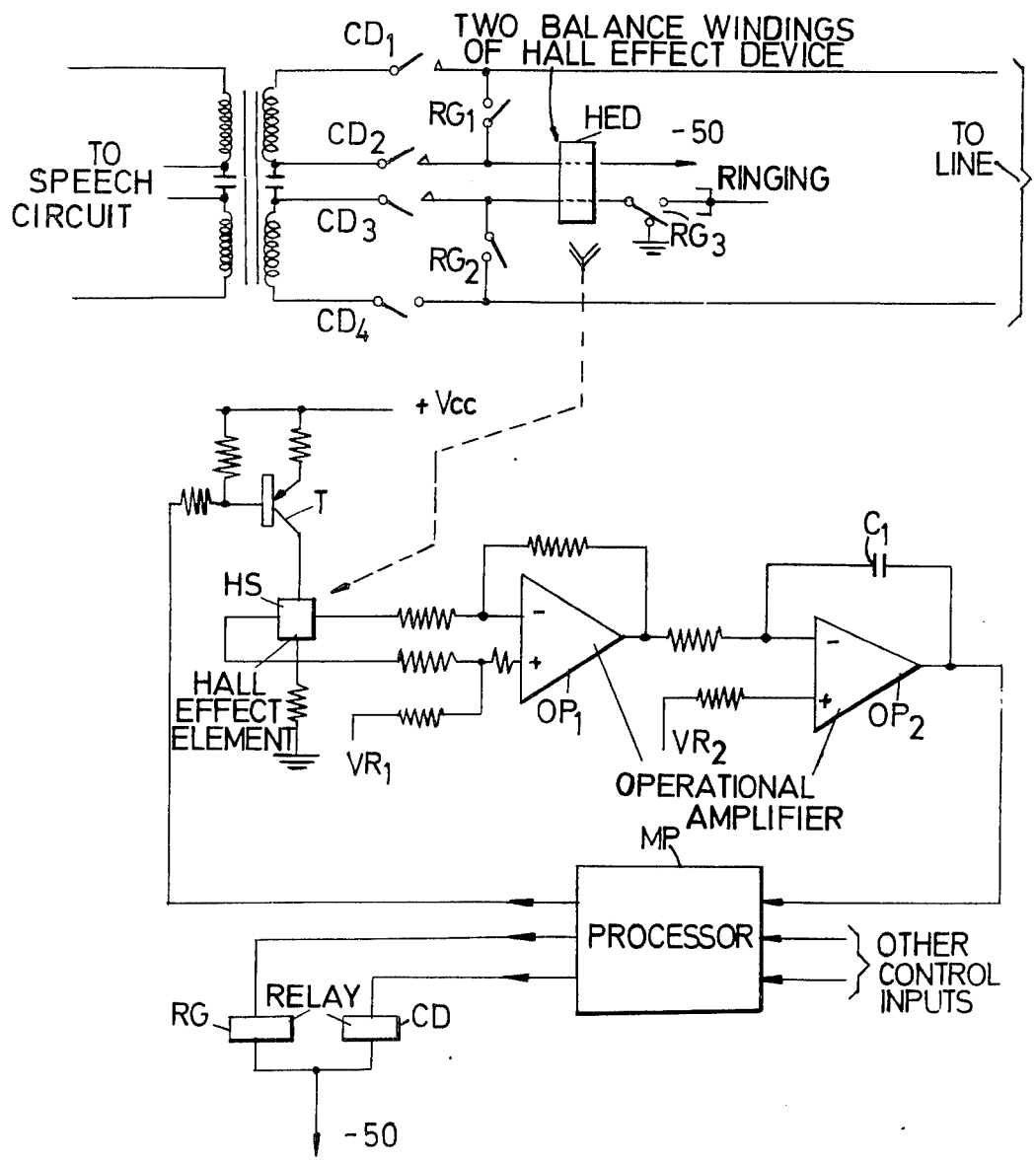
FIGS. 3 and 4 are two block diagrams of a combined ring trip and loop detection circuit in accordance with the principles of the present invention.

In FIG. 3 the Hall effect device has two balanced windings indicated at HED, which are identical to what is needed for loop detection, and as in the case of FIG. 2, the second operational amplifier OP2 has a feedback capacitor $C_1$ to establish an analog integrator function. When ringing current is to be applied to the line, processor MP operates relay RG. The relay contacts RG1 and RG2 connect the windings of the Hall effect device HED to the line, and at contact RG3 it connects the ringing current generator to the Hall effect device HED and, hence, to the line. In addition, the processor MP applies a condition to the base of the transistor T to switch on a continuous sampling current through the Hall effect element HS.

As in the circuit of FIG. 2 the ring trip condition is indicated by a change in the logic level at the output of amplifier OP2, and when this changes from logic level 0 to 1, processor MP releases relay RG to trip the ringing and operates relay CD to complete the speech connection. Note that the windings HED of the Hall effect device remain in the loop via contacts RG3, CD3, CD4, CD1 and CD2, so the device now performs a loop detection function. As long as the direct current in the loop is that for a valid off-hook condition, the output voltage of the Hall element element HS after amplification by amplifier OP1 exceeds the threshold set for amplifier OP2. Hence, its output remains at the logic level 1. When the line resumes the on-hook state the output of amplifier OP2 goes back to logic level 0, and this is interpreted by the processor MP as an indication that the speech connection is to be cleared. Hence processor MP releases the relay CD to break the connection. Note that in FIG. 3 the connections to the reference voltages which fix the thresholds of amplifier OP1 and OP2 are indicated at $V_{R1}$ and $V_{R2}$, respectively.

Figure 4:
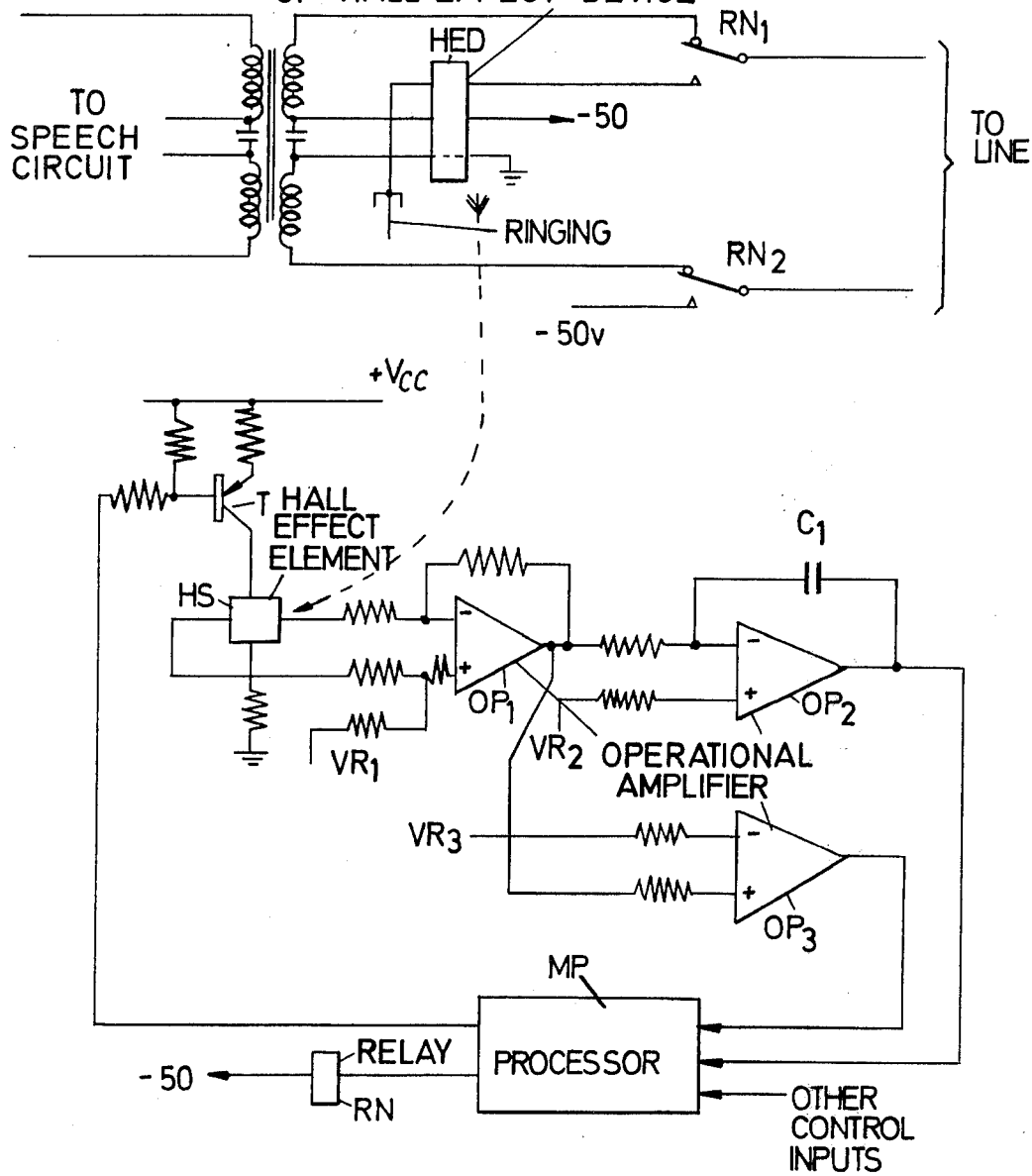

The arrangement of FIG. 4 differs from that of FIG. 3 in that the Hall effect device has three windings indicated at HED, two of which are balanced windings for loop detection while the third is an additional winding for ring trip. This enables the line polarity to be reversed when the change is made from the ringing to the speaking condition. It enables an interception circuit elsewhere in the system to perform a ring trip function without causing the loop detection to function so that a non-metered ring trip can occur. This is effected by placing a −50 volt potential on the negative wire of the speech pair via a protective resistor. An additional operational amplifier OP3 is now needed to establish the loop detector threshold in the opposite sense to that of amplifier OP2, which acts as a combined threshold and integrator.

When ringing is to be applied to the line, relay RN is operated by processor MP in use for the connection, which connects ringing current to the line via the uppermost winding of windings HED. In addition, processor MP causes a continuous control current to be applied to the Hall element HS by switching on transistor T. When the called line 'off-hooks ', the output of amplifier OP2 indicates this condition, as in the case of FIG. 3. The change of the output from amplifier OP2 from 0 to 1 is responded to by processor MP, which changes over to a speaking condition by releasing relay RN, as a result of which ringing and the uppermost winding of the Hall effect device are disconnected. The two balanced windings of the windings HED are now in circuit in the called line loop. The output from amplifier OP2 now reverts to zero, but that from amplifier OP3 to processor MP remains at logic 1 until the on-hook condition returns. When this occurs, operations are similar to those of FIG. 3.

While we have described above the principles of our invention in connection with specific apparatus it is to be clearly understood that this description is made only by way of example and not as a limitation to the scope of our invention as set forth in the objects thereof and in the accompanying claims.

We claim:
1. An electrical ring trip detection circuit comprising:
   a Hall effect device to couple ringing current to a called subscriber's subset line and to generate at its output an output voltage that is proportional to the current flow to said line;
   first means coupled to said device responsive to said output voltage to indicate whether or not direct current is on said line superimposed on said ringing current; and
   second means coupled to said first means and said device to disconnect said ringing current and to complete the connection to said line for communication between a calling party and a called party when said direct current is detected;
   said Hall effect device including
      three windings, one of said three windings and said ringing current being coupled to said line during a ringing operation and being disconnected from said line when ring trip occurs with the other two of said three windings being inserted in said circuit upon occurrence of ring trip, said other two of said three windings being balanced windings each of which are included in a different leg of said line when looped to enable monitoring off-hook and on-hook condition of said line.
2. A circuit according to claim 1, wherein
   said first means includes
      an amplifier and threshold circuit coupled to said Hall effect element to detect when said direct current in excess of a preset level is present in said line; and
   said second means includes
      a validation circuit coupled to said amplifier and threshold circuit to check whether said direct current has persisted for a predetermined period of time before a looped condition is accepted as a valid one.
3. A circuit according to claim 2, wherein
   said validation circuit includes
      an up-down counter controlled by pulses from a pulse source, said pulses increasing the count of said counter by unity for each of said pulses which occur while said line is looped and decreasing the count of said counter by unity for each of said pulses which occur while said line is unlooped, where when the up-count has reached a preset value the looped condition is accepted as a valid one.
4. A circuit according to claim 1, wherein
   said second means includes
      a micro-processor coupled to the output of said second amplifier which controls said ring current disconnection and said line connection in accordance with the output signal of said second amplifier.

5. A circuit according to claim 1, wherein
said second means includes
   a micro-processor to control the application and the removal of said ringing current and the completion of a speech path by suitable operation of relays.

6. A circuit according to claim 1, wherein
said first means includes
   a first operational amplifier having its non-inverting input coupled to a first reference voltage and both its non-inverting and inverting inputs coupled to said Hall effect element,
   a second operational amplifier having a capacitor connected between its output and its inverting input so that said second amplifier operates as an integrator, its inverting input coupled to the output of said first amplifier and its non-inverting input coupled to a second reference voltage so that the output signal of said second amplifier indicates whether said line is looped or unlooped, and
   a third operational amplifier having its non-inverting input coupled to the output of said first amplifier and its inverting input coupled to a third reference voltage so that said third amplifier can be used for line loop supervision.

* * * * *